US009638590B2

(12) United States Patent
Ollila et al.

(10) Patent No.: US 9,638,590 B2
(45) Date of Patent: May 2, 2017

(54) METHOD AND SYSTEM FOR MEASURING CLAMPING PRESSURE IN AN ELECTRODE SLIPPING DEVICE

(71) Applicant: OUTOTEC (FINLAND) OY, Espoo (FI)

(72) Inventors: Janne Ollila, Espoo (FI); Ari Ceder, Masala (FI); Seppo Juvonen, Porvoo (FI); Tom Rönnberg, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 14/902,027

(22) PCT Filed: Jun. 25, 2014

(86) PCT No.: PCT/FI2014/050520
§ 371 (c)(1),
(2) Date: Dec. 30, 2015

(87) PCT Pub. No.: WO2015/001179
PCT Pub. Date: Jan. 8, 2015

(65) Prior Publication Data
US 2016/0138982 A1    May 19, 2016

(30) Foreign Application Priority Data
Jul. 5, 2013    (FI) .................................. 20135744 U

(51) Int. Cl.
*G01L 1/22*    (2006.01)
*H05B 7/107*    (2006.01)
(52) U.S. Cl.
CPC ................ *G01L 1/22* (2013.01); *H05B 7/107* (2013.01)
(58) Field of Classification Search
CPC ............. G01L 1/22; G01N 3/02; H05B 7/107
(Continued)

(56) References Cited

U.S. PATENT DOCUMENTS

| 546,848 | A | * | 9/1895 | Groves | ..................... B43L 1/02 206/214 |
| 4,154,974 | A | | 5/1979 | Wynne | |

(Continued)

FOREIGN PATENT DOCUMENTS

| DE | 102 39 470 A1 | 3/2004 |
| DE | 10 2010 052086 A1 | 9/2011 |

(Continued)

OTHER PUBLICATIONS

International Search Report (PCT/ISA/210) issued on Oct. 13, 2014, by the European Patent Office as the International Searching Authority for International Application No. PCT/FI2014/050520.

(Continued)

*Primary Examiner* — Lisa Caputo
*Assistant Examiner* — Octavia Hollington
(74) *Attorney, Agent, or Firm* — Buchanan, Ingersoll & Rooney PC

(57) ABSTRACT

A method and a system for monitoring clamping pressure exerted by a clamping cylinder to an electrode in an electrode slipping device which comprises an upper annular holder ring and a lower annular holder ring, each comprising at least one clamping assembly including a clamping shoe and clamping cylinder arranged in co-operation so that the clamping shoe is forced into pressure contact with the electrode and released from pressure contact with the electrode by the action of the clamping cylinder. The measuring system comprises a force sensor (30) mounted in connection with a pressing piece (22) that transmits the force created by the clamping cylinder to the clamping shoe. The force sensor can be a strain gage (30) mounted in a cavity (25) provided in the pressing piece (22) or a load cell mounted between the pressing piece (22) and the clamping cylinder.

12 Claims, 4 Drawing Sheets

(58) Field of Classification Search
USPC .................................................. 73/862.627
See application file for complete search history.

(56) References Cited

U.S. PATENT DOCUMENTS

| | | | |
|---|---|---|---|
| 4,182,927 A * | 1/1980 | Phillips | H05B 7/103 373/99 |
| 7,075,966 B2 | 7/2006 | McCaffrey et al. | |
| 7,095,777 B2 | 8/2006 | Sidorski et al. | |
| 2005/0257624 A1 | 11/2005 | Henfling | |
| 2005/0259711 A1 | 11/2005 | McCaffrey et al. | |
| 2013/0039379 A1 | 2/2013 | Best et al. | |

FOREIGN PATENT DOCUMENTS

| | | |
|---|---|---|
| GB | 262481 A | 12/1927 |
| WO | WO 2004/025202 A1 | 3/2004 |

OTHER PUBLICATIONS

International Preliminary Report on Patentability (PCT/IPEA/409) issued on Oct. 13, 2015, by the European Patent Office as the International Preliminary Examining Authority for International Application No. PCT/FI2014/050520.

* cited by examiner

METHOD AND SYSTEM FOR MEASURING CLAMPING PRESSURE IN AN ELECTRODE SLIPPING DEVICE

FIELD OF THE INVENTION

The invention relates to a method for monitoring the clamping pressure exerted by a clamping cylinder to an electrode in an electrode slipping device which comprises an upper annular holder ring and a lower annular holder ring, each comprising at least one clamping assembly including a clamping shoe and a clamping cylinder arranged in co-operation so that the clamping shoe is forced into pressure contact with the electrode and released from pressure contact with the electrode by the action of the clamping cylinder.

The system also relates to a system for monitoring the clamping pressure exerted by a clamping cylinder.

BACKGROUND OF THE INVENTION

The majority of electrodes used in electric arc furnaces are self-baking electrodes, so called Söderberg electrodes. A self-baking electrode consists of an electrode casing extending from the top of the electrode to below electrode contact shoes in the furnace, and an electrode portion which initially consists of a carbon based paste in the electrode casing and which is baked by electric current into an electrically conductive solid cylindrical form in the lower portion of the electrode casing. Electrical current is connected between three-phase electrode tips, and the arc formed between the electrodes will consume the baked electrode. The electrode is held in place by a slipping device which allows controlled displacement of the electrode.

A slipping device generally consists of two clamping rings which are sequentially operated and moved to extend the electrode as the tip of the electrode is consumed in use in the furnace. Those two rings are connected with hydraulic cylinders that enable relative movement between the upper and lower clamping ring. This action enables slipping through of the electrode casing whilst always maintaining a positive grip on the casing.

GB 262481 discloses an electrode holder in the form of a ring or frame provided with pistons by which clamping pressure is exerted on the electrode. Either the clamping or releasing movement of the pistons or both of such movements can be effected by fluid pressure. Alternatively, the clamping movement of the pistons can be affected by springs.

U.S. Pat. No. 4,154,974 A discloses a clamp assembly for suspending an arc furnace electrode, including a plurality of contact shoes adapted to bear against the surface of the electrode. The contact shoes are pivotally mounted adjacent their upper ends. Force producing means independent of the shoe support engages each contact shoe for forcing the same into high pressure engagement with the electrode.

U.S. Pat. No. 7,075,966 B2 discloses a slipping clamp assembly for holding an axially-extending electrode and for axially raising and lowering the electrode. The slipping clamp assembly comprises a first slipping sleeve for exerting a first clamping force on the electrode, a second slipping sleeve for exerting a second clamping force on the electrode, and a slipping clamp frame to which both slipping sleeves are connected. Both slipping sleeves are axially movable relative to the frame and independent on one another.

U.S. Pat. No. 7,095,777 B2 discloses an electrode slipping device arrangement including a lower electrode slip clamp surrounding the electrode and carried by a ring beam, an upper electrode slip clamp which is movable relatively to the lower clamp, slipping cylinders which are connected to and between both slipping clamps, and electrical load regulating cylinders which are connected to act between the ring beam and fixed structure above the furnace roof. The electrode column also includes at least one resiliently yieldable load resisting device which is located between the upper slip clamp and structure on the ring beam and on which the electrode, when clamped only by the upper slip clamp may totally be supported and means for measuring the load induced of the load resisting device. This slipping device arrangement allows monitoring of the length of the electrode.

In a slipping device that comprises clamping assemblies including a clamping shoe and a clamping cylinder arranged in co-operation, it is important that the clamping pressure of each clamping shoe is proper. If one of the clamping cylinders does not operate properly, there is a risk of deformation of the self-baking electrode, which increases the risk of breaking of the electrode.

OBJECTIVE OF THE INVENTION

It is an objective of the present invention to provide a method for monitoring the clamping pressure exerted by a clamping shoe to an electrode held by a slipping device.

SUMMARY OF THE INVENTION

The method according to the present invention is characterized by what is presented in claim 1.

The system according to the present invention is characterized by what is presented in claim 6.

The new method comprises mounting a force sensor in connection with a pressing piece which transmits force created by the clamping cylinder to the clamping shoe, collecting data received from the force sensor, and monitoring the clamping pressure on the basis of the data received from the force sensor.

According to one aspect of the invention the force sensor is a strain gage mounted on the pressing piece.

The pressing piece can be provided with a cavity into which the strain gage can be mounted such that the strain gage is located close to the neutral axis of the pressing piece.

According to another aspect of the invention the force sensor is a load cell which can be mounted between the pressing piece and the clamping shoe or, alternatively, between the pressing piece and an end plate of the clamping cylinder.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
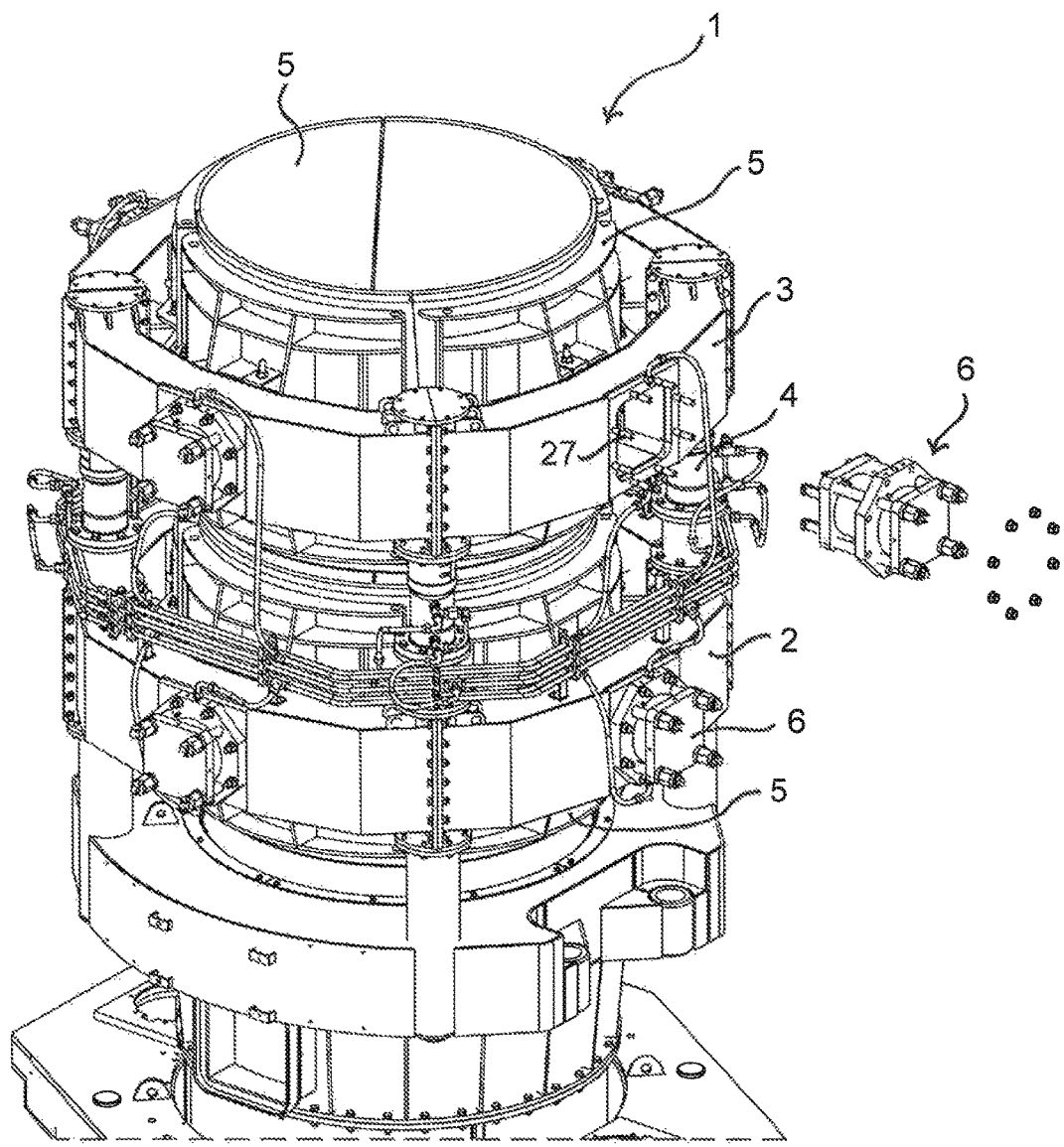
FIG. 1 is an axonometric view of a slipping device, showing one of clamping cylinders disconnected.

FIG. 1 is a schematic illustration of a slipping device 1 which can be used in connection with a self-baking electrode. The slipping device 1 comprises a lower annular holder ring 2 and an upper annular holder ring 3 which are connected with four hydraulic cylinders 4 that enable relative movement between the lower annular holder ring 2 and the upper annular holder ring 3. This movement enables slipping through of the electrode, which is surrounded by the annular holder rings 2, 3, while always maintaining a positive grip on the electrode.

Four clamping shoes 5 are connected to each annular holder ring 2, 3 at uniform intervals. The clamping shoes 5 are concave friction plates which can be pressed against the electrode located within the annular holder rings 2, 3 to clamp the electrode. Both annular holder rings 2, 3 are also provided with four spring loaded clamping cylinders 6 which can be operated to force the clamping shoes 5 into pressure contact with the electrode and to release the pressure contact between the clamping shoes 5 and the electrode. Each clamping shoe 5 forms a clamping assembly together with a clamping cylinder 6 so that the clamping shoe 5 can be forced into pressure contact with the electrode and released from pressure contact with the electrode by the action of the clamping cylinder 6.

Furthermore, the slipping device 1 also comprises hydraulic equipment needed for proper operation of the hydraulic cylinders 4 and the hydraulically operated, spring loaded clamping cylinders 6.

The operation principle of the slipping device 1 will be discussed in the following.

In the beginning, all the clamping shoes 5 of the upper annular holder ring 3 and lower annular holder ring 2 are in pressure contact with the electrode, clamping the electrode against the gravitational force.

When there is a need to lower the electrode, the clamping shoes 5 of the lower annular holder ring 2 are released from pressing against the electrode. This can be done by means of hydraulically operated, spring loaded clamping cylinders 6. The electrode is now suspended only by the clamping shoes 5 of the upper annular holder ring 3. The lower annular holder ring 2 is lowered in relation to the upper annular holder ring 3 by means of the hydraulic cylinders 4. After that, the clamping shoes 5 of the lower annular holder ring 2 are pressed against the electrode by means of the spring loaded clamping cylinders 6 of the lower holder ring 2.

Thereafter the same procedure is repeated with the clamping shoes 5 of the upper annular holder ring 3.

Finally, the electrode is again held in place with the help of the clamping shoes 5 of both annular holder rings 2, 3, until a new need arises to lower the electrode again.

Figure 3:
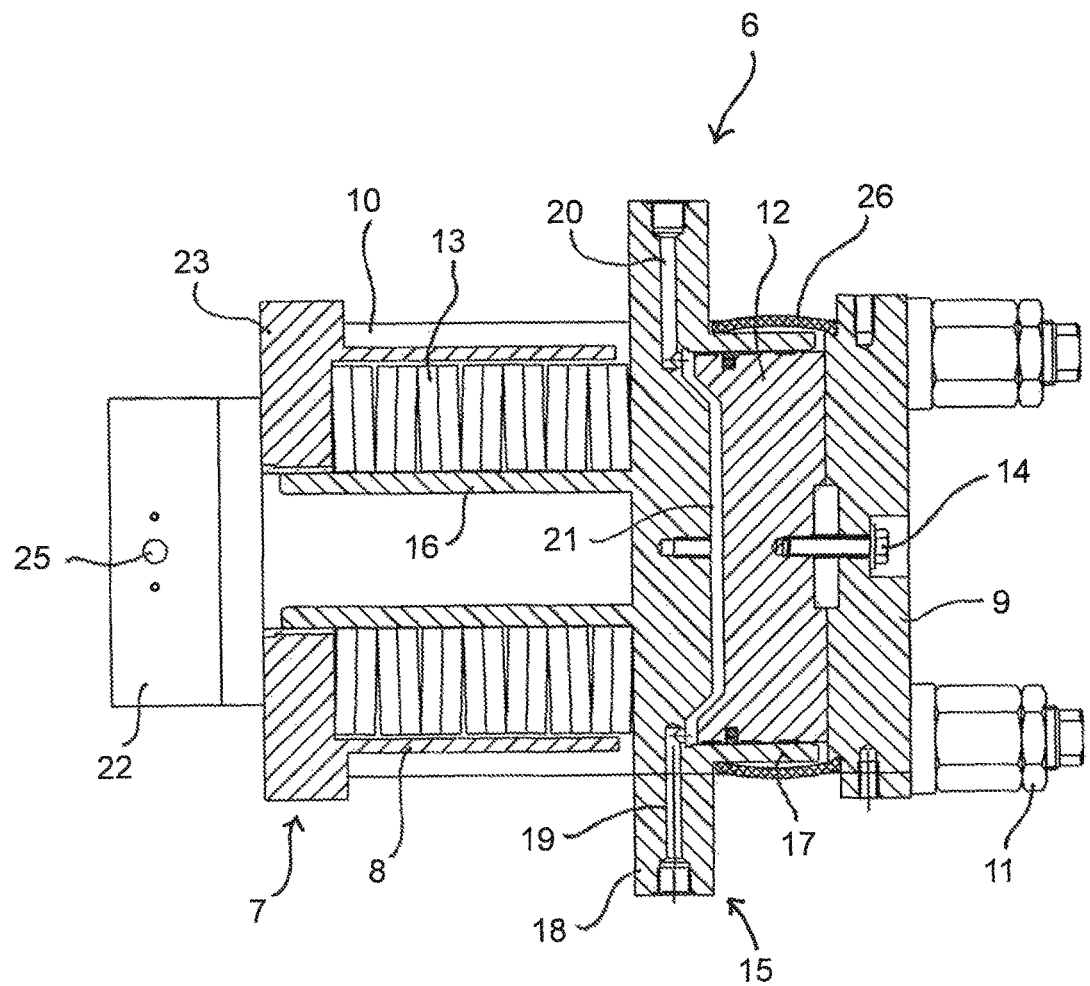
FIG. 3 is a sectional side view of the clamping cylinder.
Figure 4:
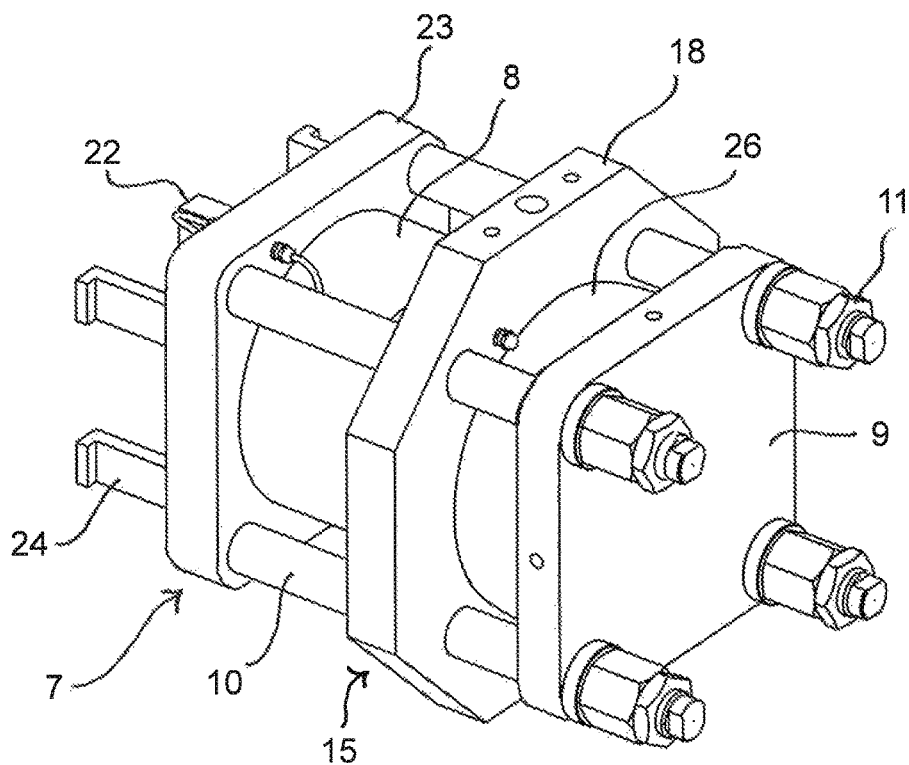
FIG. 4 is an axonometric front view of the clamping cylinder.
Figure 5:
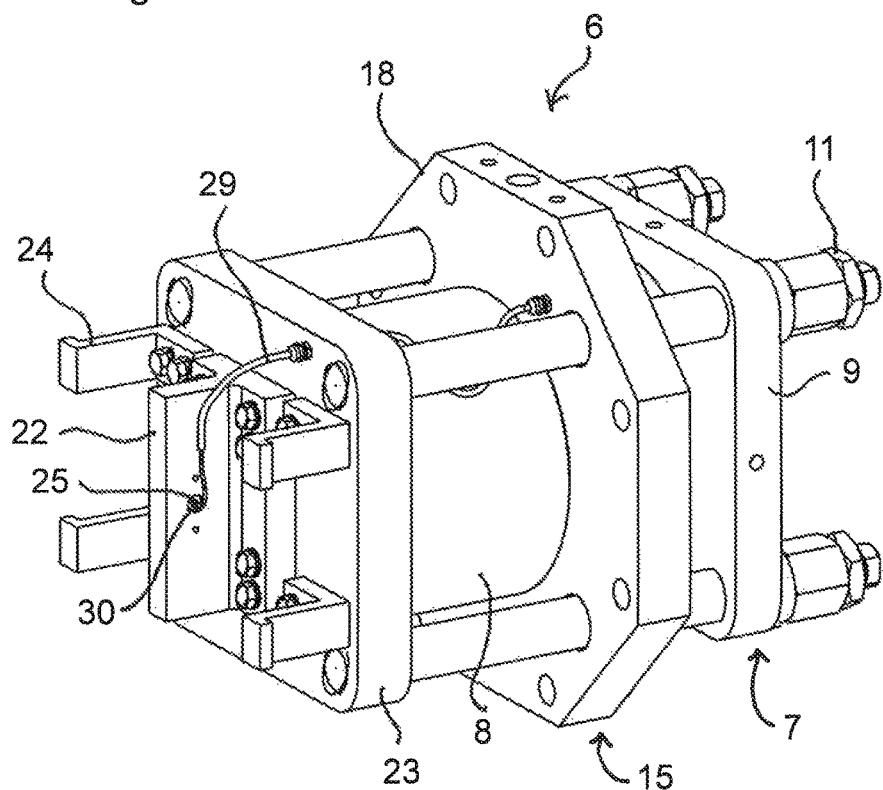
FIG. 5 is an axonometric back view of the clamping cylinder.

The structure of a spring loaded clamping cylinder 6 is illustrated in more detail in FIGS. 3-5.

The clamping cylinder 6 comprises a spring cylinder housing 8, which is connected to a spring cylinder head 9 by means of four spring cylinder drawbars 10 and locking nuts 11 fixed at the outer ends of the drawbars 10. A spring cylinder piston 12 is fastened to the inner surface of the spring cylinder head 9 by means of a fastening screw 14. A disk spring 13 is located in the spring cylinder housing 8. The spring cylinder housing 8, spring cylinder head 9 and spring cylinder drawbars 10 together form a movable cylinder element 7.

A stationary cylinder element 15 is arranged on the spring cylinder drawbars 10 between the spring cylinder housing 8 and the spring cylinder head 9. The stationary cylinder element 15 comprises a first cylinder portion 16 enveloping the disk spring 13 from inward, a second cylinder portion 17 enveloping the spring cylinder piston 12 from outward, and a flange portion 18 connecting the first cylinder portion 16 to the second cylinder portion 17. The flange portion 18 is provided with a first fluid passage 19 and a second fluid passage 20, which are connectable to the hydraulic system, and a fluid chamber 21 confined between the spring cylinder piston 12 and the flange portion 18. The annular gap between the spring cylinder head 9 and the flange portion 18 is covered and sealed by a piston protection sealing 26.

Figure 2:
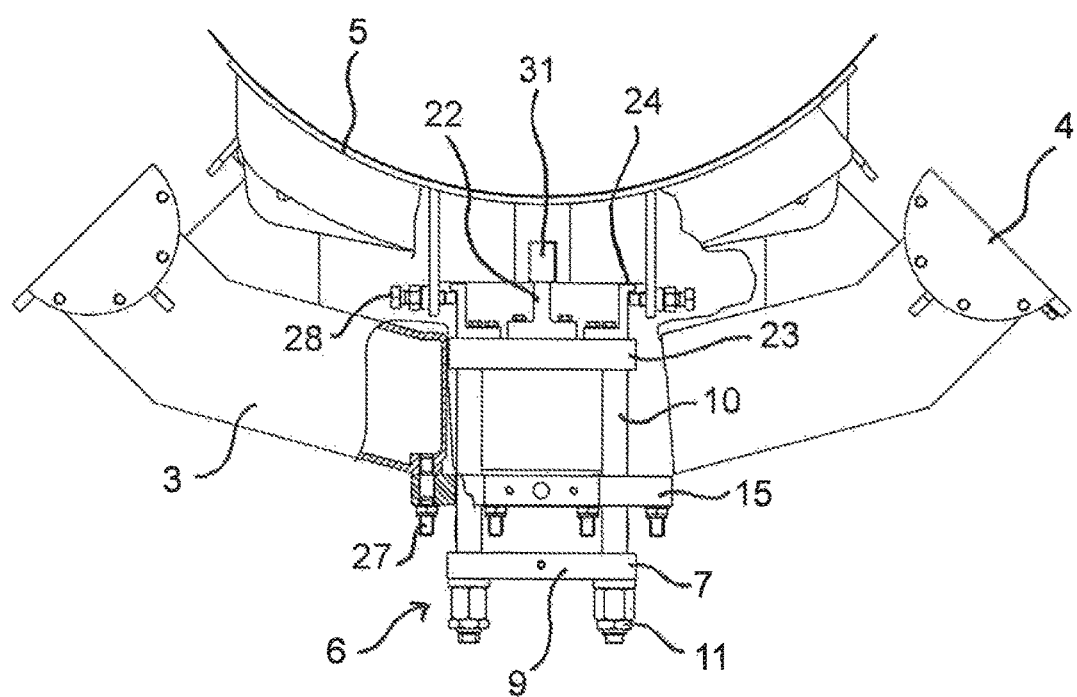
FIG. 2 is a partial and partly sectional top view of a clamping cylinder mounted in the slipping device.

The stationary cylinder element 15 can be secured to the annular holder ring 3 by means of bolts 27 (FIG. 2). The spring cylinder housing 8, the spring cylinder head 9 and the spring cylinder drawbars 10 make up a movable element 7 that can slide a small distance closer to the electrode (to the left in FIG. 3) and farther off from the electrode (to the right in FIG. 3).

A spring cylinder pressing piece 22 is fastened into an end plate 23 of the spring cylinder housing 8. In a clamping situation, the pressing piece 22 exerts a clamping force to a force receiving part 31 in the clamping shoe 5 (FIG. 2). Also four drawers 24 for drawing the clamping shoe 5 apart from the electrode are fastened into the end plate 23. The drawers 24 are provided with L-shaped locking ends which enable anchoring the spring cylinder housing 8 to the clamping shoe 5 with locking screws 28 (FIG. 2). The coupling between the drawers 24 and the clamping shoe 5 can be dismantled by removing the locking screws 28.

The operation principle of the clamping cylinder 6 will be discussed in the following.

Normally the spring force of the disk spring 13 keeps the spring cylinder pressing piece 22 pressed against the clamping shoe 5 so that the clamping shoe 5 is clamped against the electrode. Four clamping cylinders 6 are arranged symmetrically around the electrode casing and the clamping pressure created by each clamping cylinder 6 should be equal.

To release the clamping pressure, the fluid chamber 21 between the flange portion 18 and the spring cylinder piston 12 is filled with hydraulic fluid, which forces the movable element 7 to slide to the right against the force of the disk spring 13. As the spring cylinder housing 8 is connected to the clamping shoe 5, the movement of the spring cylinder piston 12 to the right reduces the pressure that is exerted to the electrode by the clamping shoe 5. As the similar procedure is carried out in connection with each clamping cylinder 6 of the same annular holder ring 2 or 3, the pressure contact between the electrode and the clamping shoes 5 is released. This allows displacement of the annular holder ring 2 or 3 so that the electrode can be lowered or raised a small distance.

The clamping pressure exerted by the pressing piece 22 to the force receiving part 31 of the clamping shoe 5 and further to the electrode can be measured by means of a strain gage 30 which is placed in a cavity 25 provided in the pressing piece 22. Preferably, the depth of the cavity 25 is selected so that the strain gage 30 is located close to the neutral axis of the pressing piece 22. The signal measured by the strain gage 30 is transferred to a control unit (not shown) via wiring 29.

Alternatively, the clamping pressure exerted by the pressing piece 22 to the clamping shoe 5 and further to the electrode can be measured by means of a load cell (not shown). The load cell can be placed, for instance, between the pressing piece 22 and the end plate 23 of the movable cylinder element 7, or between the pressing piece 22 and the force receiving part 31 of the clamping shoe 5.

Above the invention has been described by way of examples with reference to the exemplifying embodiments and implementations illustrated in the accompanying drawings. The invention is, however, not confined to the exemplifying embodiments shown in the drawings alone but it rather covers various modifications and equivalent arrangements, which fall within the scope of the following claims.

The invention claimed is:

1. A method for monitoring the clamping pressure exerted by a clamping cylinder to an electrode in an electrode slipping device which comprises an upper annular holder ring and a lower annular holder ring, each comprising at least one clamping assembly including a clamping shoe and a clamping cylinder arranged in co-operation so that the clamping shoe is forced into pressure contact with the electrode and released from pressure contact with the electrode by the action of the clamping cylinder, wherein said method for monitoring is conducted by mounting a force sensor in connection with a pressing piece that transmits the force created by the clamping cylinder to the clamping shoe, collecting data received from the force sensor, and monitoring the clamping pressure on the basis of the data received from the force sensor.

2. A method according to claim 1, wherein a strain gage is used as the force sensor.

3. A method according to claim 2, wherein the pressing piece is provided with a cavity and the strain gage is mounted into the cavity such that the strain gage is located close to the neutral axis of the pressing piece.

4. A method according to claim 1, wherein a load cell is used as the force sensor and the load cell is mounted between the pressing piece and the clamping shoe.

5. A method according to claim 1, wherein a load cell is used as the force sensor and the load cell is mounted between the pressing piece and an end plate of the clamping cylinder.

6. A method according to claim 1, wherein the clamping cylinder includes a fixed portion and a movable portion, and the pressing piece is movable together with the movable portion.

7. A system for monitoring the clamping pressure exerted by a clamping cylinder to an electrode in an electrode slipping device which comprises an upper annular holder ring and a lower annular holder ring, each comprising at least one clamping assembly including a clamping shoe and a clamping cylinder arranged in co-operation so that the clamping shoe can be forced into pressure contact with the electrode and released from pressure contact with the electrode by the action of the clamping cylinder, and a force sensor provided in connection with a pressing piece that transmits the force created by the clamping cylinder to the clamping shoe.

8. A system according to claim 7, wherein the force sensor is a strain gage mounted on the pressing piece.

9. A system according to claim 8, wherein the pressing piece is provided with a cavity and that the strain gage is mounted in the cavity so that the strain gage is located close to and parallel to the neutral axis of the pressing piece.

10. A system according to claim 7, wherein the force sensor is a load cell which is mounted between the pressing piece and the clamping shoe.

11. A system according to claim 7, wherein the force sensor is a load cell which is mounted between the pressing piece and an end plate of the clamping cylinder.

12. A system according to claim 7, wherein the clamping cylinder includes a fixed portion and a movable portion, and the pressing piece is movable together with the movable portion.

* * * * *